US010956194B2

(12) United States Patent
Yang et al.

(10) Patent No.: US 10,956,194 B2
(45) Date of Patent: Mar. 23, 2021

(54) LEARNING A MAC ADDRESS IN VXLAN

(71) Applicant: HANGZHOU H3C TECHNOLOGIES CO., LTD., Zhejiang (CN)

(72) Inventors: Jun Yang, Beijing (CN); Hui Cao, Beijing (CN); Fengshan Du, Beijing (CN); Wei Guo, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 131 days.

(21) Appl. No.: 15/515,443

(22) PCT Filed: Sep. 23, 2015

(86) PCT No.: PCT/CN2015/090355
§ 371 (c)(1),
(2) Date: Mar. 29, 2017

(87) PCT Pub. No.: WO2016/050158
PCT Pub. Date: Apr. 7, 2016

(65) Prior Publication Data
US 2017/0228251 A1    Aug. 10, 2017

(30) Foreign Application Priority Data
Sep. 29, 2014   (CN) .................... 201410512469.3

(51) Int. Cl.
*G06F 15/173*     (2006.01)
*G06F 9/455*      (2018.01)
(Continued)

(52) U.S. Cl.
CPC ...... *G06F 9/45558* (2013.01); *H04L 12/4633* (2013.01); *H04L 12/4675* (2013.01);
(Continued)

(58) Field of Classification Search
CPC ............ H04L 61/6022; H04L 12/4641; G06F 2009/45595; Y02D 30/30
See application file for complete search history.

(56) References Cited
U.S. PATENT DOCUMENTS 7,248,579 B1 *   7/2007   Friedman ................ H04L 45/02
                                                        370/389
10,050,808 B2 *  8/2018   Qu ...................... H04L 12/4641
(Continued)

FOREIGN PATENT DOCUMENTS

CN      102882761         1/2013
CN      103503413 A       1/2014
(Continued)

OTHER PUBLICATIONS

Callon, R., "Use of OSI IS-IS for Routing in TCP/IP and Dual Environments", Network Working Group, Request for Comments: 1195, Dec. 1990, 71 pages.
(Continued)

Primary Examiner — Umar Cheema
Assistant Examiner — Tesfu N Mekonen

(57) ABSTRACT

A source Medium Access Control (MAC) address is learned upon receiving a data message from a local network, and a learned local MAC address entry is added to a MAC address forwarding table. A source MAC address is not learned upon receiving a data message from a tunnel. When a local MAC address entry in the MAC address forwarding table changes, a synchronization message is sent via each tunnel associated with a Virtual Extensible Local Area Network (VXLAN) in the changed local MAC address entry, and is saved into a database corresponding to the tunnel. Each tunnel corresponds to one database.

15 Claims, 9 Drawing Sheets

(51) Int. Cl.
  *H04L 12/46* (2006.01)
  *H04L 12/24* (2006.01)
  *H04L 29/12* (2006.01)
(52) U.S. Cl.
  CPC .......... *H04L 12/4683* (2013.01); *H04L 41/08* (2013.01); *G06F 2009/45595* (2013.01); *H04L 61/6022* (2013.01); *H04L 2012/4629* (2013.01); *H04L 2212/00* (2013.01)

(56) References Cited

U.S. PATENT DOCUMENTS

| | | | | |
|---|---|---|---|---|
| 2012/0014386 A1* | 1/2012 | Xiong | ............... | H04L 29/12028 370/392 |
| 2012/0106523 A1 | 5/2012 | Anumala et al. | | |
| 2014/0280827 A1 | 9/2014 | Kamble | | |
| 2014/0348166 A1* | 11/2014 | Yang | ..................... | H04L 45/124 370/392 |
| 2015/0016300 A1* | 1/2015 | Devireddy | .......... | H04L 41/0893 370/254 |
| 2015/0016461 A1* | 1/2015 | Qiang | ..................... | H04L 45/74 370/392 |
| 2015/0124586 A1* | 5/2015 | Pani | ...................... | H04L 41/082 370/219 |
| 2015/0124654 A1* | 5/2015 | Pani | .................... | G06F 3/04842 370/256 |
| 2015/0124822 A1* | 5/2015 | Chu | ......................... | H04L 45/22 370/392 |
| 2015/0172165 A1* | 6/2015 | Tessmer | .................. | H04L 45/02 370/254 |
| 2015/0280928 A1* | 10/2015 | Tessmer | .............. | H04L 12/4641 370/390 |
| 2015/0281062 A1* | 10/2015 | Duda | ...................... | H04L 45/74 709/238 |
| 2015/0379150 A1* | 12/2015 | Duda | .................... | G06F 16/955 707/736 |
| 2015/0381495 A1* | 12/2015 | Cherian | ................ | H04L 45/745 370/392 |

FOREIGN PATENT DOCUMENTS

| | | |
|---|---|---|
| CN | 103780485 | 5/2014 |
| CN | 103841023 A | 6/2014 |
| CN | 104243318 | 12/2014 |
| CN | 104243630 | 12/2014 |

OTHER PUBLICATIONS

International Searching Authority, "International Search Report and Written Opinion", Jan. 20, 2016, PCT Patent Application No. PCT/CN2015/090355, State Intellectual Property Office of the P R China 8 pages.

Mahalingam et al., "VXLAN: A Framework for Overlaying Virtualized Layer 2 Networks over Layer 3 Networks", Internet Engineering Task Force, Feb. 22, 2013, 20 pages.

Mahalingam et al., "Virtual extensible Local Area Network (VXLAN): A Framework for Overlaying Virtualized Layer 2 Networks over Layer 3 Networks", Request for Comments: 7348 Aug. 2014 19 pages.

Unknown, "ISO/IEC JTC1/SC6 Telecommunications and Information Exchange Between Systems", Second Edition, IS-IS intra-domain routeing protocol, SC 6 (Seoul Meeting) May 23, 1998 Jun. 16, 1998 (revised) 134 pages.

Unknown, "Vxlan Basic Understanding", Freezgw1985 Column, Nov. 16, 2013, 13 pages.

Xu et al., "NVo3 Control Plane Protocol Using IS-IS draft-xu-nvo3-isis-cp-00", IETF, Oct. 15, 2012, 14 pages.

Cai et al., "The Evolution of the Carrier Cloud Networking", IEEE Seventh International Symposium on Service-Oriented System Engineering, Mar. 28, 2013, pp. 1-13.

* cited by examiner

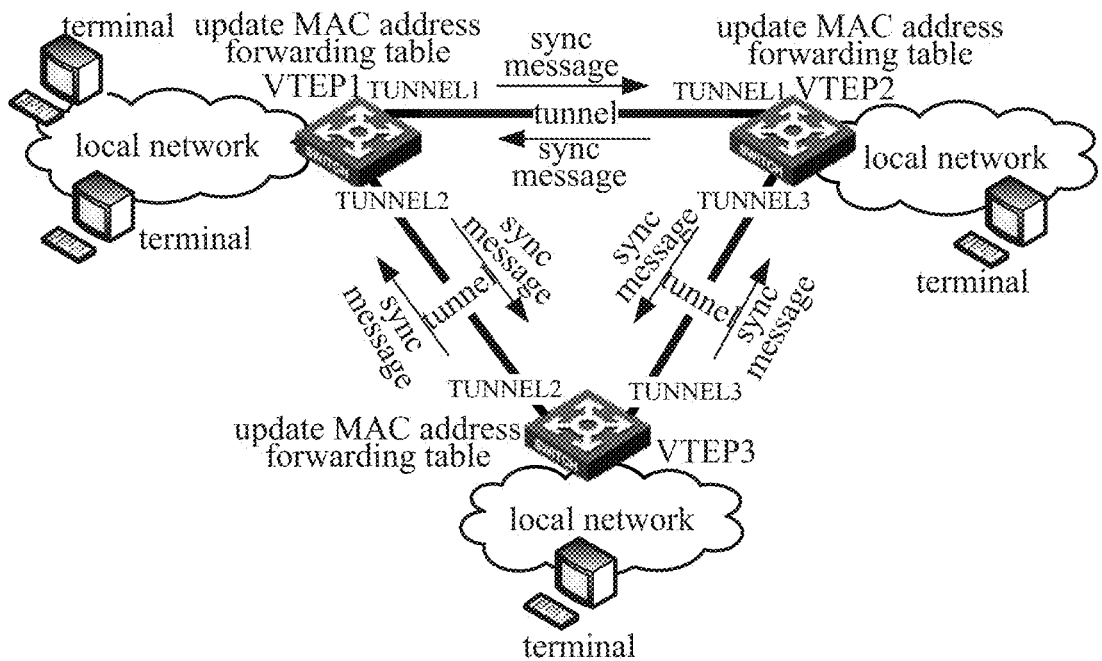

FIG. 1

| when a data message is received from a local network, a source MAC address is learned, a learned local MAC address entry is added to a MAC address forwarding table; and when a data message is received from a tunnel, a source MAC address is not learned | S10 |

| when a local MAC address entry in the MAC address forwarding table changes, a synchronization message is sent via each tunnel associated with a VXLAN in the changed local MAC address entry, and the synchronization message is saved into a database corresponding to the tunnel. Each tunnel corresponds to one database | S20 |

FIG. 2

LEARNING A MAC ADDRESS IN VXLAN

BACKGROUND

Virtual eXtensible Local Area Network (VXLAN) is an overlay network technology, in which a message is encapsulated according to a Media Access Control (MAC) in User Datagram Protocol (UDP) method. For example, an initial message may be encapsulated into a UDP message.

A VXLAN includes VXLAN Tunnel End Points (VTEPs) and a local network which may be composed of multiple terminal devices such as virtual machines. A VTEP is an edge device of the VXLAN, and may be implemented by a physical switch or a virtual switch. Any two VTEPs may communicate with each other by establishing a tunnel between them over a layer 3 network. A VXLAN is identified by a VXLAN Network Identifier (VNI). The length of the VNI may for example be 24 bits long.

BRIEF DESCRIPTION OF THE DRAWINGS

Features of the present disclosure are illustrated by way of example and not limited in the following figure(s), in which like numerals indicate like elements, in which:

FIG. 1 is a diagram illustrating the structure of a VXLAN according to an example of the present disclosure.

FIG. 2 is a flowchart illustrating a method for learning a MAC address according to an example of the present disclosure.

DETAILED DESCRIPTION

Figure 3:
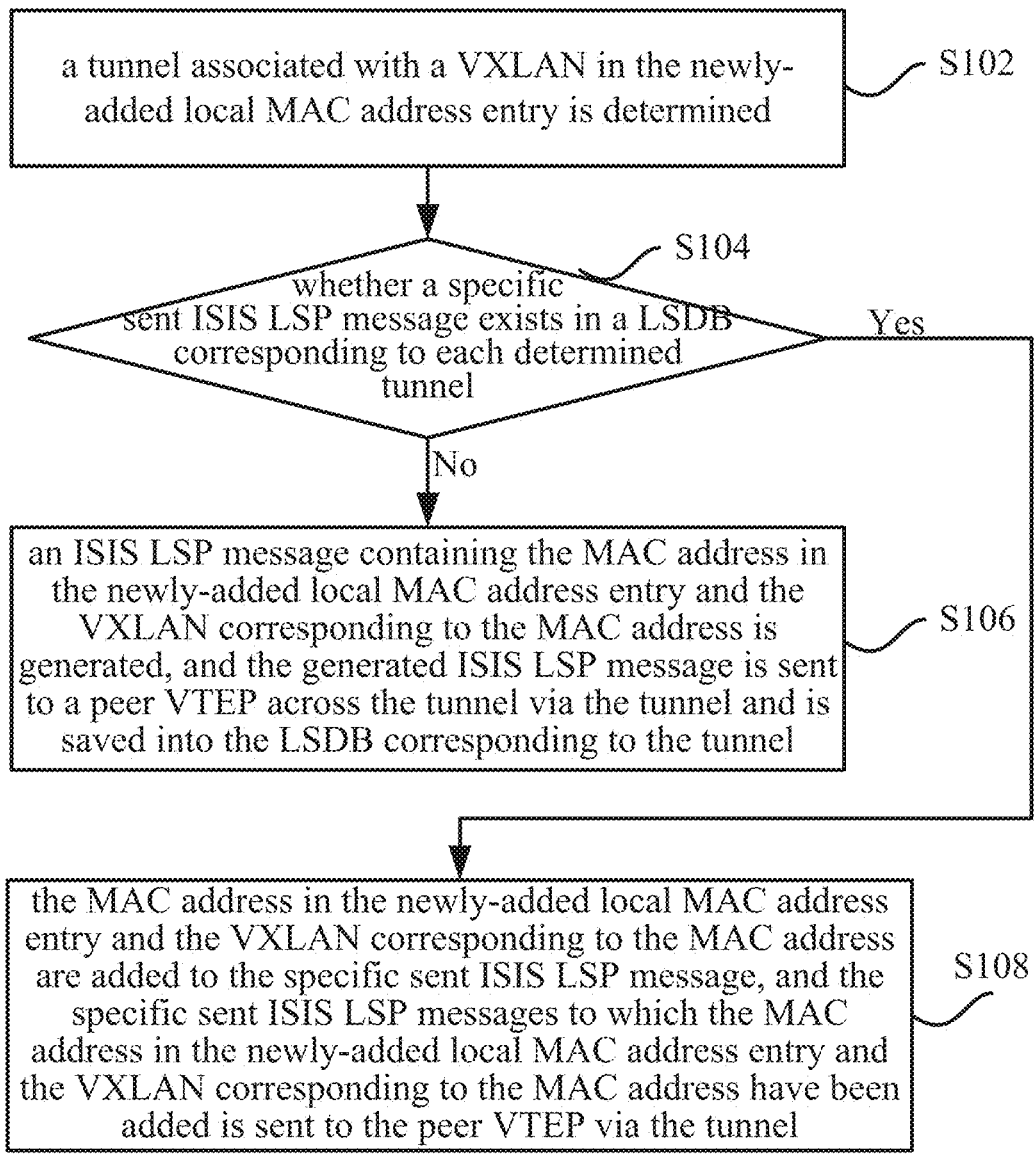
FIG. 3 is a flowchart illustrating an operation process performed by a VTEP when a local MAC address entry is newly added according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

In a VXLAN, a VTEP performs MAC address learning by employing a self-learning mode in a data plane. The VTEP may trigger MAC address learning when receiving a data frame. When receiving a data frame from a local network or a tunnel, the VTEP learns a source MAC address of the data frame and a VXLAN corresponding to the source MAC address to an ingress interface of the data frame, and configures a MAC address entry in a MAC address forwarding table shown in Table 1.

TABLE 1

| MAC address | VXLAN | egress interface |
| --- | --- | --- |

When the data frame is received from the local network, an egress interface in the configured MAC address entry is a physical port via which the VTEP is connected to a source terminal device sending the data frame. When the data frame is received from the tunnel, the egress interface in the configured MAC address entry is a tunnel via which the data frame is received. In various examples of the present disclosure, a MAC address entry obtained by triggering the MAC address learning of the data frame received from the local network is called a local MAC address entry.

In various examples of the present disclosure, a method and apparatus for learning a MAC address in a VXLAN are provided to implement the automatic synchronization of MAC address information in a control plane. Since the synchronization of MAC address information in a data plane is performed in real time, network convergence can be speeded up.

FIG. 1 is a diagram illustrating the structure of a VXLAN according to an example of the present disclosure. The method provided according to various examples of the present disclosure may be applicable to any VTEP in the multi-connected VXLAN shown in FIG. 1. The term "multi-connected" means that a device is connected to multiple devices in the VXLAN. On a VTEP, a function of learning the source MAC address of a data message received from a local network is opened and a function of learning the source MAC address of a data message received from a tunnel is closed. Since the VXLAN is run on a tunnel, the VXLAN should be associated or bundled with the tunnel. A database is established for each tunnel on the VTEP. Each tunnel corresponds to one database. The database may save synchronization (sync) messages sent and received via the tunnel corresponding to the database, and contents stored in the database are organized based on received synchronization messages. Accordingly, the database may also be called a packet storage.

FIG. 2 is a flowchart illustrating a method for learning a MAC address according to an example of the present disclosure. The method may be applicable to any VTEP in a VXLAN and includes following blocks.

At block S10, when a data message is received from a local network, a source MAC address is learned, a learned local MAC address entry is added to a MAC address forwarding table; and when a data message is received from a tunnel, a source MAC address is not learned.

At block S20, when a local MAC address entry in the MAC address forwarding table changes, a synchronization message is sent via each tunnel associated with a VXLAN in the changed local MAC address entry, and the synchronization message is saved into a database corresponding to the tunnel. Each tunnel corresponds to one database. Accordingly, a peer VTEP across the tunnel may update a MAC address forwarding table on the peer VTEP according to the synchronization message.

In the method provided according to the example of the present disclosure, when receiving the data message from the local network, any VTEP learns the source MAC address of the data message, and adds the learned local MAC address entry to the MAC address forwarding table. When a local MAC address entry in a MAC address forwarding table on any VTEP changes, for example, a local MAC address entry is newly added or removed, the VTEP may send a synchronization message via each tunnel associated with a VXLAN in the changed local MAC address entry, and save the synchronization message into a database corresponding to the tunnel. Accordingly, a peer VTEP across the tunnel may updates a MAC address forwarding table on the peer VTEP according to the synchronization message. In the method provided according to the example of the present disclosure, when a data message is received from a tunnel, the source MAC address is not learned.

When a local MAC address entry in a MAC address forwarding table on any VTEP changes, for example, a local MAC address entry is newly added or removed, the VTEP may send a synchronization message via each tunnel associated with a VXLAN in the newly-added or removed local MAC address entry to a peer VTEP across the tunnel, so as to notify the peer VTEP to update the MAC address forwarding table on the peer VTEP. Accordingly, MAC address information in the local MAC address entries on the VTEPs at both ends of the tunnel can be synchronized automatically. Since the synchronization of MAC address information is performed in real time, network convergence can be speeded up, the number of unicast data messages with unknown destination addresses can be decreased, and the waste of network bandwidth resources can be reduced. Further, each tunnel corresponds to one independent database for saving synchronization messages sent and received via the tunnel, and thus the synchronization messages can be saved conveniently.

In various examples of the present disclosure, the synchronization message may be implemented by an ISIS LSP message or another network protocol message.

In following examples, the synchronization message is implemented by the ISIS LSP message. An ISIS protocol is enabled on a VTEP. The VTEP establishes, via each tunnel configured on the VTEP, an ISIS neighbor relationship with a peer VTEP across the tunnel. Any VTEP may establish, via a tunnel configured on the VTEP, an ISIS neighbor relationship with a peer VTEP across the tunnel. Afterwards, the VTEP may send ISIS LSP messages to the peer VTEP, receive ISIS LSP messages from the peer VTEP, and save the sent and received ISIS LSP messages into a Link State DataBase (LSDB) corresponding to the tunnel.

FIG. 3 is a flowchart illustrating an operation process performed by a VTEP when a local MAC address entry is newly added according to an example of the present disclosure. As shown in FIG. 3, when any VTEP detects that a local MAC address entry is newly added to a MAC address forwarding table on the VTEP, the VTEP performs following blocks.

At block S102, a tunnel associated with a VXLAN in the newly-added local MAC address entry is determined, and block S104 is performed.

At block S104, it is determined whether a specific sent ISIS LSP message exists in a LSDB corresponding to each determined tunnel. When determining that the specific sent ISIS LSP message does not exist, block S106 is performed. When determining that the specific sent ISIS LSP message exists, block S108 is performed.

The specific sent ISIS LSP message is a sent ISIS LSP message to which a MAC address in the newly-added local MAC address entry and a VXLAN corresponding to the MAC address can be added. The specific sent ISIS LSP message has an idle space for containing the MAC address in the newly-added local MAC address entry and the VXLAN corresponding to the MAC address.

At block S106, an ISIS LSP message containing the MAC address in the newly-added local MAC address entry and the VXLAN corresponding to the MAC address is generated, and the generated ISIS LSP message is sent to a peer VTEP across the tunnel via the tunnel and is saved into the LSDB corresponding to the tunnel.

In various examples, when identifications (IDs) of ISIS LSP messages are numbered from small to large, the generated ISIS LSP message contains the ID of an unoccupied ISIS LSP message having the smallest ID. The ID is also called a slice number.

At block S108, the MAC address in the newly-added local MAC address entry and the VXLAN corresponding to the MAC address are added to the specific sent ISIS LSP message, and the specific sent ISIS LSP messages to which the MAC address in the newly-added local MAC address entry and the VXLAN corresponding to the MAC address have been added is sent to the peer VTEP via the tunnel.

Even if the MAC address in the newly-added local MAC address entry and the VXLAN corresponding to the MAC address are added, the ID of the specific sent ISIS LSP messages is unchanged.

Figures 4, 5:
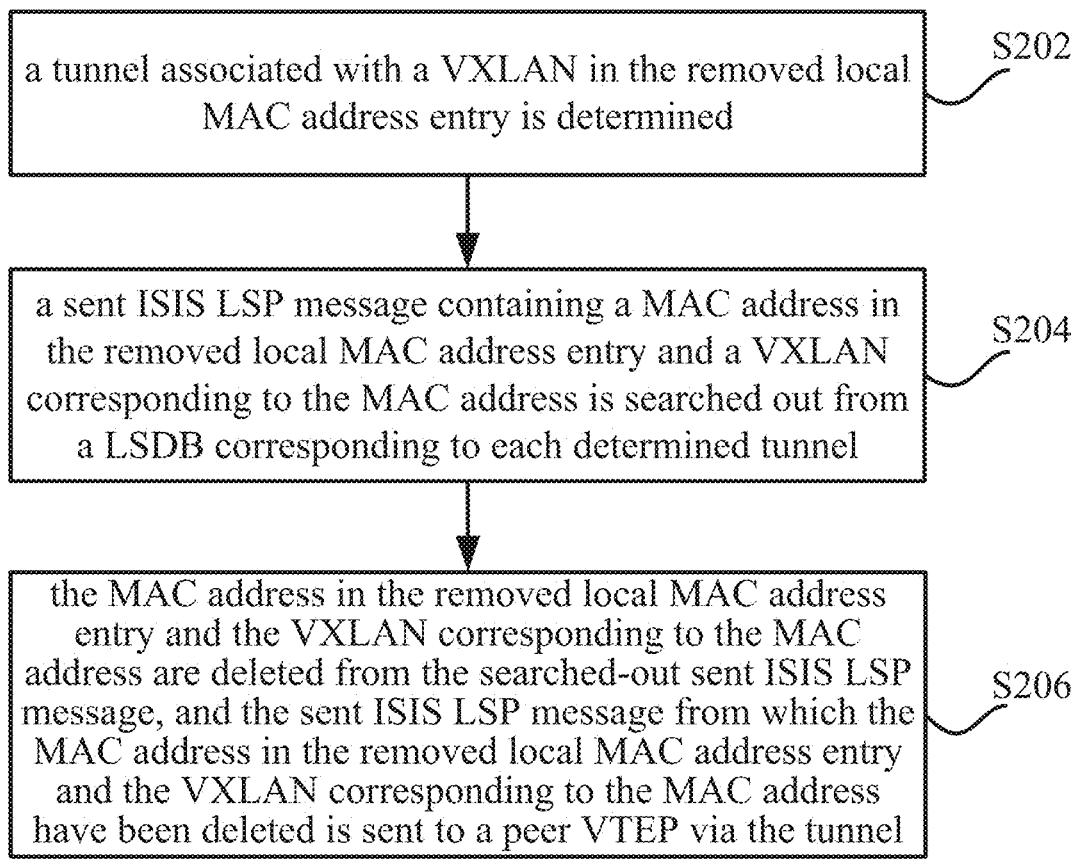
FIG. 4 is a diagram illustrating a format of Type Length Value (TLV) for containing a VXLAN and a MAC address corresponding to the VXLAN according to an example of the present disclosure.
FIG. 5 is a flowchart illustrating an operation process performed by a VTEP when a local MAC address entry is removed according to an example of the present disclosure.

In various examples, the ISIS LSP message includes a message header and a message body. The message body includes a TLV. All kinds of information are encapsulated into different TLVs. In an example, a new type of TLV may be defined to contain a MAC address and a VXLAN corresponding to the MAC address. FIG. 4 is a diagram illustrating a format of TLV for containing a VXLAN and a MAC address corresponding to the VXLAN according to an example of the present disclosure. As shown in FIG. 4, the new type of TLV may include following fields.

A Type field may indicate the type of TLV. When the value of the Type field is set as a specific value, the Type field indicates that the TLV may contain a VXLAN and a MAC address corresponding to the VXLAN. For example, the specific value may be 147, and the length of the Type field may be 1 byte.

A Length field may contain the length of all fields in the TLV except the Type field and the Length field. The value of the Length field may be set as 7+6*N, where N represents the number of MAC addresses. The length of the Length field may be 1 byte.

A Topology-Id/Nickname field may identify a sender according to an actual application environment. In a VXLAN, the Topology-Id/Nickname field is invalid, and the value of the Topology-Id/Nickname field is set as 0, which represents that subsequent MAC addresses are available via a source VTEP initiating the TLV, without differentiating the topology and nickname. The length of the Topology-Id/Nickname field may be 2 bytes.

A Confidence field is used for preference of conflicted MAC addresses. The length of the Confidence field may be 1 byte.

A reservation (RSV) bit is filled with 0.

A TAG bit may indicate that a subsequent field contains a VXLAN when the value of the TAG bit is set as a value such as 2.

A VXLAN field may contain a VXLAN. The total length of the RSV bit, the TAG bit and the VXLAN field may be 4 bytes.

A MAC field may contain a MAC address corresponding to the VXLAN. The length of the MAC field may be 6 bytes.

In an example, a method for determining whether the MAC address in the newly-added local MAC address entry and the VXLAN corresponding to the MAC address may be added to a sent ISIS LSP message may be implemented as follows. A difference A between the largest message length (for example, 1400 bytes) and the length of the sent ISIS LSP message is calculated. It is determined whether the difference A is not smaller than B, where B represents the length of a TLV shown in FIG. 4 that is occupied by the MAC address in the newly-added local MAC address entry and the VXLAN corresponding to the MAC address. The length of the TLV may be 15 bytes. When determining that the difference A is not smaller than B, it is determined that the MAC address in the newly-added local MAC address entry and the VXLAN corresponding to the MAC address may be added to the sent ISIS LSP message. Otherwise, it is determined that the MAC address in the newly-added local MAC address entry and the VXLAN corresponding to the MAC address may not be added to the sent ISIS LSP message.

In an example, the specific sent ISIS LSP message is reconstructed when the MAC address in the newly-added local MAC address entry and the VXLAN corresponding to the MAC address are added to the specific sent ISIS LSP message. If a VXLAN contained in a TLV in the specific sent ISIS LSP message is the same as the VXLAN in the newly-added local MAC address entry, the MAC address in the newly-added local MAC address entry is added to the TLV. If a VXLAN contained in any TLV in the specific sent ISIS LSP message is different from the VXLAN in the newly-added local MAC address entry, a TLV containing the MAC address in the newly-added local MAC address entry and the VXLAN corresponding to the MAC address is added to the specific sent ISIS LSP message. Accordingly, MAC addresses that are contained in the reconstructed specific sent ISIS LSP message and correspond to the same VXLAN are contained in the same TLV.

FIG. 5 is a flowchart illustrating an operation process performed by a VTEP when a local MAC address entry is removed according to an example of the present disclosure. As shown in FIG. 5, when any VTEP detects that a local MAC address entry is removed from a MAC address forwarding table on the VTEP, the VTEP performs following blocks.

At block S202, a tunnel associated with a VXLAN in the removed local MAC address entry is determined, and block S204 is performed.

At block S204, a sent ISIS LSP message containing a MAC address in the removed local MAC address entry and a VXLAN corresponding to the MAC address is searched out from a LSDB corresponding to each determined tunnel, and block S206 is performed.

Since the MAC address in the removed local MAC address entry and the VXLAN corresponding to the MAC address have been contained in an ISIS LSP message and the ISIS LSP message has been synchronized via the tunnel associated with the VXLAN, the sent ISIS LSP message containing the MAC address in the removed local MAC address entry and the VXLAN corresponding to the MAC address can be searched out from the LSDB corresponding to the tunnel at block S204.

At block S206, the MAC address in the removed local MAC address entry and the VXLAN corresponding to the MAC address are deleted from the sent ISIS LSP message searched out at block S204, and the sent ISIS LSP message from which the MAC address in the removed local MAC address entry and the VXLAN corresponding to the MAC address have been deleted is sent to a peer VTEP via the tunnel.

Even if the MAC address in the removed local MAC address entry and the VXLAN corresponding to the MAC address are deleted, the ID of the sent ISIS LSP message is unchanged.

As can be seen from the format of the TLV shown in FIG. 4, in an example, the sent ISIS LSP message is reconstructed when the MAC address (called MAC1) in the removed local MAC address entry and the VXLAN (called VXLAN1) corresponding to the MAC address are deleted. Since the sent ISIS LSP message containing MAC1 and VXLAN1 corresponding to MAC1 can be searched out at block S204 and a TLV containing MAC1 and VXLAN1 corresponding to MAC1 can be further searched out from the sent ISIS LSP message, MAC1 is deleted from the searched-out TLV at block S206. If the TLV has no any MAC address after MAC1 is deleted, the TLV is deleted. If the sent ISIS LSP message has no any TLV after the TLV is deleted, the ISIS LSP message containing a message header but not containing the TLV is sent to the peer VTEP, and is deleted after a period of time. For example, the period of time may be set as 60 seconds. If the TLV has another MAC address after MAC1 is deleted, or if the sent ISIS LSP message has another TLV after the TLV is deleted, the ISIS LSP message not containing MAC1 or the TLV is sent out.

By the methods shown in FIGS. 3 and 5, when any VTEP finds that a local MAC address entry is newly added to or removed from the MAC address forwarding table, the VTEP may synchronize the MAC address in the newly-added or removed local MAC address entry and the VXLAN corresponding to the MAC address to the peer VTEP through an ISIS LSP message. The MAC address in the newly-added or removed local MAC address entry and the VXLAN corresponding to the MAC address may be synchronized to a peer VTEP across a tunnel associated with the VXLAN in the newly-added or removed local MAC address entry. If the VXLAN in the newly-added or removed local MAC address entry is not associated with any tunnel, the MAC address in the newly-added or removed local MAC address entry and the VXLAN corresponding to the MAC address are not synchronized via any tunnel. MAC addresses and VXLANs corresponding to the MAC addresses that are synchronized via different tunnels may be different.

Figure 6A:
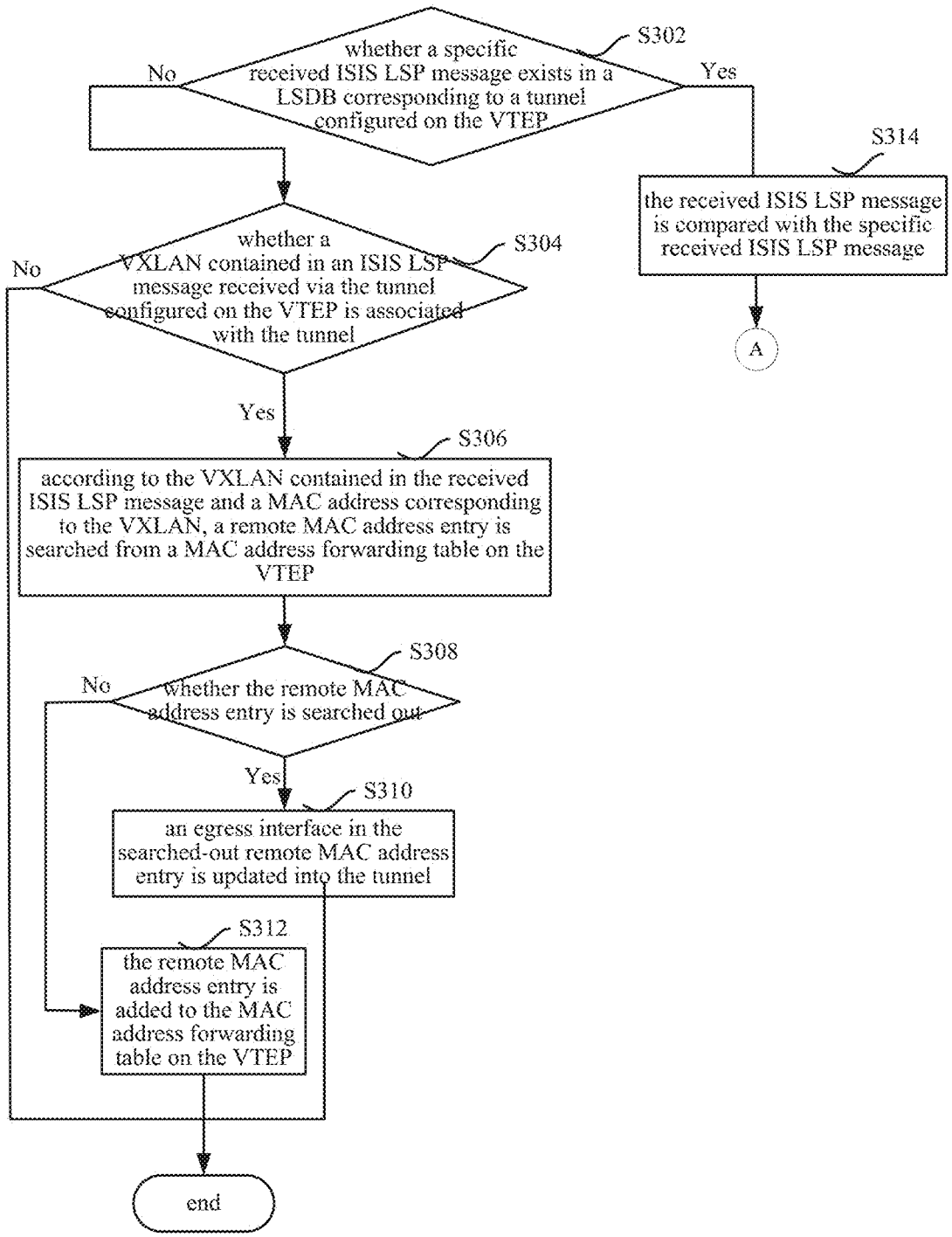
FIG. 6A-6B is a flowchart illustrating an operation process performed by a VTEP when receiving an Intermediate System to Intermediate System (ISIS) Link State Protocol data unit (LSP) message from a peer VTEP according to an example of the present disclosure.
Figure 6B:
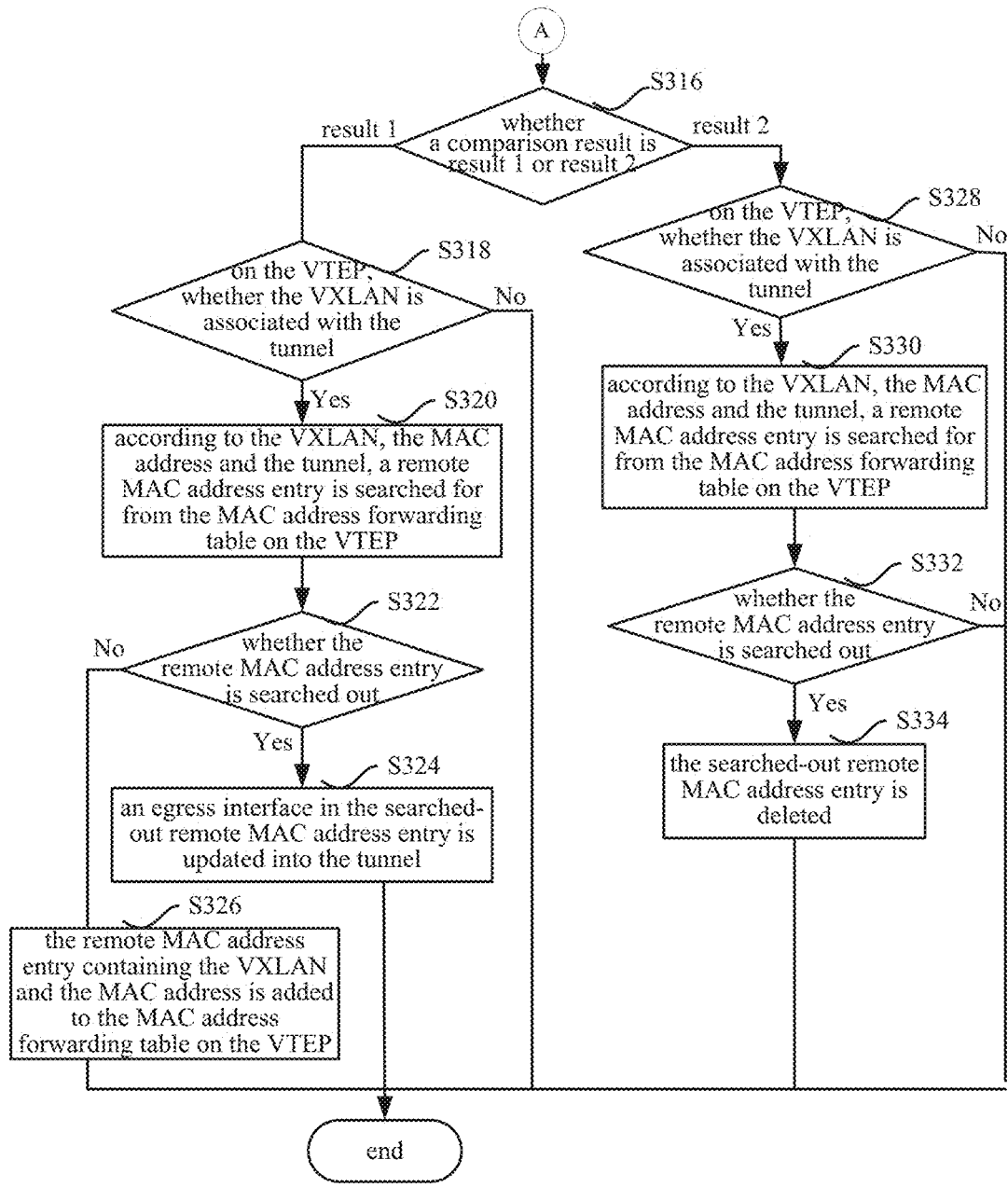

Any VTEP may receive, via a tunnel configured on the VTEP, an ISIS LSP message from a peer VTEP across the tunnel. FIG. 6A-6B is a flowchart illustrating an operation process performed by a VTEP when receiving an ISIS LSP message from a peer VTEP according to an example of the present disclosure. As shown in FIG. 6A-6B, the VTEP may perform following blocks.

At block S302, it is determined whether a specific received ISIS LSP message exists in a LSDB corresponding to a tunnel configured on the VTEP. When determining that the specific received ISIS LSP message does not exist, block S304 is performed; otherwise, block S314 is performed.

The specific received ISIS LSP message is a received ISIS LSP message having the same ID as that of a received ISIS LSP message. Accordingly, the specific received ISIS LSP message has the same ID as that of the received ISIS LSP message.

At block S304, it is determined whether a VXLAN contained in an ISIS LSP message received via the tunnel configured on the VTEP is associated with the tunnel. When the VXLAN contained in the ISIS LSP message received via the tunnel configured on the VTEP is associated with the tunnel, block S306 is performed; otherwise, this flowchart ends.

At block S306, according to the VXLAN contained in the received ISIS LSP message and a MAC address corresponding to the VXLAN, a remote MAC address entry is searched from a MAC address forwarding table on the VTEP, and block S308 is performed.

At block S308, it is determined whether the remote MAC address entry is searched out at block S306. When the remote MAC address entry is searched out, block S310 is performed; otherwise, block S312 is performed.

At block S310, an egress interface in the searched-out remote MAC address entry is updated into the tunnel, and then this flowchart ends.

Suppose the VXLAN contained in the received ISIS LSP message and the MAC address corresponding to the VXLAN are called VXLAN1 and MAC1 respectively, and the tunnel via which the ISIS LSP message is received is TUNNEL1. The remote MAC address entry searched out at block S306 is shown in Table 2-1, and the remote MAC address entry whose egress interface has been updated at block S310 is shown in Table 2-2.

TABLE 2-1

| MAC address | VXLAN | egress interface |
|---|---|---|
| MAC1 | VXLAN1 | TUNNEL2 |

TABLE 2-2

| MAC address | VXLAN | egress interface |
|---|---|---|
| MAC1 | VXLAN1 | TUNNEL1 |

At block S312, the remote MAC address entry is added to the MAC address forwarding table on the VTEP, and then this flowchart ends.

The added remote MAC address entry includes the VXLAN contained in the received ISIS LSP message and the MAC address corresponding to the VXLAN. The egress interface in the added remote MAC address entry is set as the tunnel.

Suppose the VXLAN contained in the received ISIS LSP message and the MAC address corresponding to the VXLAN are called VXLAN1 and MAC1 respectively, and the tunnel via which the ISIS LSP message is received is TUNNEL1, the remote MAC address entry added at block S312 is shown in Table 2-3.

TABLE 2-3

| MAC address | VXLAN | egress interface |
|---|---|---|
| MAC1 | VXLAN1 | TUNNEL1 |

At block S314, the received ISIS LSP message is compared with the specific received ISIS LSP message, and block S316 is performed.

At block S316, it is determined whether a comparison result obtained at block S314 is result 1 or result 2. If the comparison result is result 1, block S318 is performed. If the comparison result is result 2, block S328 is performed.

The comparison result being result 1 indicates that the received ISIS LSP message contains a MAC address corresponding to a VXLAN, but the specific received ISIS LSP message does not contain the MAC address corresponding to the VXLAN. Accordingly, the MAC address that is contained in the received ISIS LSP message and corresponds to the VXLAN does not exist in the specific received ISIS LSP message, which indicates that a local MAC address entry containing the VXLAN and the MAC address is newly added to a MAC address forwarding table on the peer VTEP.

The comparison result being result 2 indicates that the specific received ISIS LSP message contains a MAC address corresponding to a VXLAN, but the received ISIS LSP message does not contain the MAC address corresponding to the VXLAN. Accordingly, the MAC address that is contained in the specific received ISIS LSP message and corresponds to the VXLAN does not exist in the received ISIS LSP message, which indicates that a local MAC address entry containing the VXLAN and the MAC address is removed from the MAC address forwarding table on the peer VTEP.

At block S318, it is determined on the VTEP whether the VXLAN is associated with the tunnel. When determining that the VXLAN is associated with the tunnel, block S320 is performed; otherwise, this flowchart ends.

At block S320, according to the VXLAN, the MAC address and the tunnel, a remote MAC address entry is searched for from the MAC address forwarding table on the VTEP, and block S322 is performed.

At block S322, it is determined whether the remote MAC address entry is searched out. When determining that the remote MAC address entry is searched out, block S324 is performed; otherwise, block S326 is performed.

At block S324, an egress interface in the searched-out remote MAC address entry is updated into the tunnel.

Suppose the received ISIS LSP message contains MAC2 corresponding to VXLAN2, the specific received ISIS LSP message does not contain MAC2 corresponding to VXLAN2, and the tunnel via which the ISIS LSP message is received is TUNNEL1. The remote MAC address entry searched out at block S320 is shown in Table 3-1, and the remote MAC address entry whose egress interface has been updated at block S324 is shown in Table 3-2.

TABLE 3-1

| MAC address | VXLAN | egress interface |
|---|---|---|
| MAC2 | VXLAN2 | TUNNEL2 |

TABLE 3-2

| MAC address | VXLAN | egress interface |
| --- | --- | --- |
| MAC2 | VXLAN2 | TUNNEL1 |

At block S326, the remote MAC address entry containing the VXLAN and the MAC address is added to the MAC address forwarding table on the VTEP.

Suppose the received ISIS LSP message contains MAC2 corresponding to VXLAN2, the specific received ISIS LSP message does not contain MAC2 corresponding to VXLAN2, and the tunnel via which the ISIS LSP message is received is TUNNEL1. The remote MAC address entry added at block S326 is shown in Table 3-3.

TABLE 3-3

| MAC address | VXLAN | egress interface |
| --- | --- | --- |
| MAC2 | VXLAN2 | TUNNEL1 |

At block S328, it is determined on the VTEP whether the VXLAN is associated with the tunnel. When determining that the VXLAN is associated with the tunnel, block S330 is performed; otherwise, this flowchart ends.

At block S330, according to the VXLAN, the MAC address and the tunnel, a remote MAC address entry is searched for from the MAC address forwarding table on the VTEP, and block S332 is performed.

At block S332, it is determined whether the remote MAC address entry is searched out. When determining that the remote MAC address entry is searched out, block S334 is performed; otherwise, this flowchart ends.

At block S334, the searched-out remote MAC address entry is deleted, and then this flowchart ends.

In the above method, after determining that the specific received ISIS LSP message exists, the specific received ISIS LSP message is replaced with the received ISIS LSP message.

By the method shown in FIG. 6A-6B, when any VTEP receives the ISIS LSP message from the peer VTEP across the tunnel, the VTEP may determine, according to the received ISIS LSP message saved in the LSDB corresponding to the tunnel, whether a local MAC address entry is newly added to or removed from the MAC address forwarding table on the peer VTEP.

In various examples of the present disclosure, a MAC address entry learned according to a data message received from a local network is called a local MAC address entry, and a MAC address entry learned according to MAC address information synchronized by a peer VTEP across a tunnel is called a remote MAC address entry.

In the methods shown in FIGS. 3, 5 and 6, each tunnel on a VTEP corresponds to one LSDB dependent from another LSDB. When any VTEP finds that a local MAC address entry changes, for example, a local MAC address entry is newly added or removed, via a tunnel associated with a VXLAN in the newly-added or removed local MAC address entry, the VTEP may synchronize a MAC address in the newly-added or removed local MAC address entry and the VXLAN corresponding to the MAC address to a peer VTEP across the tunnel through an ISIS LSP message, and save the ISIS LSP message into a LSDB corresponding to the tunnel. When any VTEP receives an ISIS LSP message from a peer VTEP, the VTEP may determine, according to the received ISIS LSP message and a received ISIS LSP message saved in a LSDB corresponding to a tunnel via which the ISIS LSP message is received, whether a local MAC address entry is newly added to or removed from a MAC address forwarding table on the peer VTEP. When determining that the VXLAN in the newly-added or removed local MAC address entry on the VTEP is associated with the tunnel, the VTEP may update the MAC address forwarding table on the VTEP according to the newly-added or removed local MAC address entry. The remote MAC address entry may be added to, removed from or edited in the MAC address forwarding table on the VTEP, so that MAC address information in the local MAC address entries on the VTEPs at both ends of the tunnel can be synchronized automatically. Since the synchronization of MAC address information is performed in real time, network convergence can be speeded up, the number of unicast data messages with unknown destination addresses can be decreased, and the waste of network bandwidth resources can be reduced.

According to the VXLAN shown in FIG. 1, the method for learning the MAC address is described again as follows.

VTEP1 is configured with VXLAN1-VXLAN20, and configured with TUNNEL1 and TUNNEL2 of VXLAN type. TUNNEL1 is associated with VXLAN5-VXLAN15, and TUNNEL2 is associated with VXLAN10-VXLAN20. A local MAC address entry newly added on VTEP1 is shown in Table 4-1.

TABLE 4-1

| MAC address | VXLAN | egress interface |
| --- | --- | --- |
| MAC1 | VXLAN1 | XX |
| MAC10 | VXLAN10 | XX |

VTEP2 is configured with VXLAN5-VXLAN15, and configured with TUNNEL1 and TUNNEL3 of VXLAN type. TUNNEL1 is associated with VXLAN5-VXLAN15, and TUNNEL3 is associated with VXLAN10-VXLAN15. A local MAC address entry newly added on VTEP2 is shown in Table 4-2.

TABLE 4-2

| MAC address | VXLAN | egress interface |
| --- | --- | --- |
| MAC5 | VXLAN5 | XX |
| MAC15 | VXLAN15 | XX |

VTEP3 is configured with VXLAN10-VXLAN30, and configured with TUNNEL2 and TUNNEL3 of VXLAN type. TUNNEL2 is associated with VXLAN10-VXLAN20, and TUNNEL3 is associated with VXLAN10-VXLAN15. A local MAC address entry newly added on VTEP3 is shown in Table 4-3.

TABLE 4-3

| MAC address | VXLAN | egress interface |
| --- | --- | --- |
| MAC20 | VXLAN20 | XX |
| MAC30 | VXLAN30 | XX |

VTEP1 establishes an ISIS neighbor relationship with VTEP2 via TUNNEL1, and establishes an ISIS neighbor relationship with VTEP3 via TUNNEL2. VTEP2 establishes an ISIS neighbor relationship with VTEP1 via TUNNEL1, and establishes an ISIS neighbor relationship with VTEP3 via TUNNEL3. VTEP3 establishes an ISIS neighbor relationship with VTEP1 via TUNNEL2, and establishes an ISIS neighbor relationship with VTEP2 via TUNNEL3.

The method for learning the MAC address by VTEP1-VTEP3 is implemented as follows.

VTEP1 sends to VTEP2 an ISIS LSP message containing MAC10 and VXLAN10 corresponding to MAC10 via TUNNEL1, and saves the ISIS LSP message into a LSDB corresponding to TUNNEL1. VTEP1 sends to VTEP3 an ISIS LSP message containing MAC10 and VXLAN10 corresponding to MAC10 via TUNNEL2, and saves the ISIS LSP message into a LSDB corresponding to TUNNEL2. Since VXLAN1 in a local MAC address entry containing MAC and VXLAN1 corresponding to MAC1 is not associated with any tunnel, MAC1 and VXLAN1 are not synchronized.

VTEP2 sends to VTEP1 an ISIS LSP message containing MAC5, VXLAN5 corresponding to MAC5, MAC15 and VXLAN15 corresponding to MAC15 via TUNNEL1, and saves the ISIS LSP message into the LSDB corresponding to TUNNEL1. VTEP2 sends to VTEP3 an ISIS LSP message containing MAC15 and VXLAN15 corresponding to MAC15 via TUNNEL3, and saves the ISIS LSP message into a LSDB corresponding to TUNNEL3.

VTEP3 sends to VTEP1 an ISIS LSP message containing MAC20 and VXLAN20 corresponding to MAC20 via TUNNEL2, and saves the ISIS LSP message into the LSDB corresponding to TUNNEL2. Since VXLAN30 in a local MAC address entry containing MAC30 and VXLAN30 corresponding to MAC30 is not associated with any tunnel, MAC30 and VXLAN30 are not synchronized.

VTEP1 may receive the ISIS LSP message containing MAC5, VXLAN5 corresponding to MAC5, MAC15 and VXLAN15 corresponding to MAC15 from VTEP2 via TUNNEL1, and save the ISIS LSP message into the LSDB corresponding to TUNNEL1. VTEP1 may receive the ISIS LSP message containing MAC20 and VXLAN20 corresponding to MAC20 from VTEP3 via TUNNEL2, and save the ISIS LSP message into the LSDB corresponding to TUNNEL2. A remote MAC address entry is added to the MAC address forwarding table shown in Table 4-1, and the MAC address forwarding table to the remote MAC address entry has been added is shown in Table 5-1.

TABLE 5-1

| MAC address | VXLAN | egress interface |
| --- | --- | --- |
| MAC1 | VXLAN1 | XX |
| MAC10 | VXLAN10 | XX |
| MAC5 | VXLAN5 | TUNNEL1 |
| MAC15 | VXLAN15 | TUNNEL1 |
| MAC20 | VXLAN20 | TUNNEL2 |

VTEP2 may receive the ISIS LSP message containing MAC10 and VXLAN10 corresponding to MAC10 from VTEP1 via TUNNEL1, and save the ISIS LSP message into the LSDB corresponding to TUNNEL1. A remote MAC address entry is added to the MAC address forwarding table shown in Table 4-2, and the MAC address forwarding table to which the remote MAC address entry has been added is shown in Table 5-2.

TABLE 5-2

| MAC address | VXLAN | egress interface |
| --- | --- | --- |
| MAC5 | VXLAN5 | XX |
| MAC15 | VXLAN15 | XX |
| MAC10 | VXLAN10 | TUNNEL1 |

VTEP3 may receive the ISIS LSP message containing MAC10 and VXLAN10 corresponding to MAC10 from VTEP1 via TUNNEL2, and save the ISIS LSP message into the LSDB corresponding to TUNNEL2. VTEP3 may receive the ISIS LSP message containing MAC15 and VXLAN15 corresponding to MAC15 from VTEP2 via TUNNEL3, and save the ISIS LSP message into the LSDB corresponding to TUNNEL3. A remote MAC address entry is added to the MAC address forwarding table shown in Table 4-3, and the MAC address forwarding table to which the remote MAC address entry has been added is shown in Table 5-3.

TABLE 5-3

| MAC address | VXLAN | egress interface |
| --- | --- | --- |
| MAC20 | VXLAN20 | XX |
| MAC30 | VXLAN30 | XX |
| MAC10 | VXLAN10 | TUNNEL2 |
| MAC15 | VXLAN15 | TUNNEL3 |

An apparatus for learning a MAC address is also provided according to an example of the present disclosure. The above method may be applicable to the apparatus. The apparatus may be applied to a VTEP.

Figure 7:
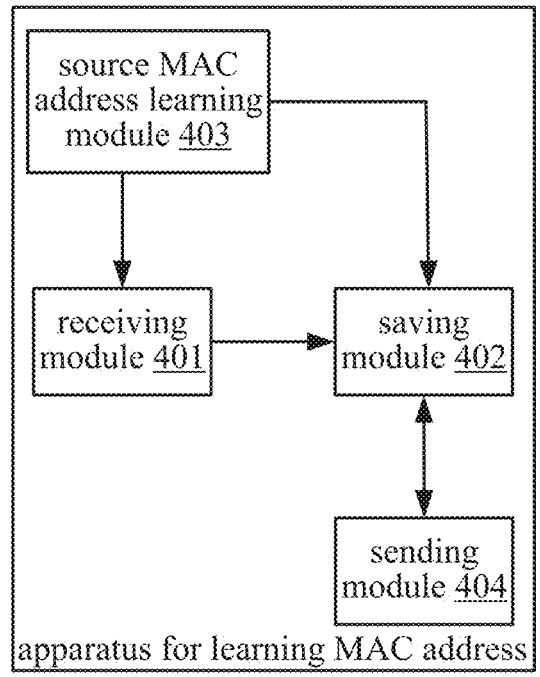
FIG. 7 is a diagram illustrating the structure of an apparatus for learning a MAC address according to an example of the present disclosure.

FIG. 7 is a diagram illustrating the structure of an apparatus for learning a MAC address according to an example of the present disclosure. As shown in FIG. 7, the apparatus includes a receiving module 401, a source MAC address learning module 403 and a sending module 404.

The receiving module 401 may receive a data message from a local network and receive a data message from a tunnel.

The source MAC address learning module 403 may learn a source MAC address after the receiving module 401 receives the data message from the local network, and add a learned local MAC address entry to a MAC address forwarding table; may not learn a source MAC address after the receiving module 401 receives the data message from the tunnel.

When a local MAC address entry in the MAC address forwarding table changes, the sending module 404 may send a synchronization message via each tunnel associated with a VXLAN in the changed local MAC address entry, and save the synchronization message into a database corresponding to the tunnel, so that a peer VTEP across the tunnel updates a MAC address forwarding table on the peer VTEP according to the synchronization message. Each tunnel corresponds to one database.

The apparatus further includes a saving module 402. The saving module 402 may save the MAC address forwarding table and the database corresponding to the tunnel.

The sending module 404 may include a tunnel determining unit, a message determining unit, a message generating unit, a message adding unit and a message sending unit.

When a local MAC address entry is newly added to the MAC address forwarding table, the tunnel determining unit may determine a tunnel associated with a VXLAN in the newly-added local MAC address entry.

The message determining unit may determine whether a specific sent ISIS LSP message exists in a LSDB corresponding to each tunnel associated with the VXLAN in the newly-added local MAC address entry. The specific sent ISIS LSP message is a sent ISIS LSP message to which a MAC address in the newly-added local MAC address entry and a VXLAN corresponding to the MAC address can be added.

When the message determining unit determines that the specific sent ISIS LSP message does not exist, the message generating unit may generate an ISIS LSP message containing the MAC address in the newly-added local MAC address entry and the VXLAN corresponding to the MAC address, and save the generated ISIS LSP message into the LSDB corresponding to the tunnel.

When the message determining unit determines that the specific sent ISIS LSP message exists, the message adding unit may add the MAC address in the newly-added local MAC address entry and the VXLAN corresponding to the MAC address to the specific sent ISIS LSP message.

When the message determining unit determines that the specific sent ISIS LSP message does not exist in a LSDB corresponding to each tunnel associated with the VXLAN in the newly-added local MAC address entry, the message sending unit may send the ISIS LSP message generated by the message generating unit to the peer VTEP via the tunnel. When the message determining unit determines that the specific sent ISIS LSP message exists in the LSDB corresponding to each tunnel associated with the VXLAN in the newly-added local MAC address entry, the message sending unit may send to the peer VTEP via the tunnel the specific sent ISIS LSP message to which the MAC address in the newly-added local MAC address entry and the VXLAN corresponding to the MAC address have been added by the message adding unit.

The sending module 404 further includes a message searching unit and a message deleting unit.

When a local MAC address entry is removed from the MAC address forwarding table, the tunnel determining unit may determine a tunnel associated with a VXLAN in the removed local MAC address entry.

For each tunnel associated with the VXLAN in the removed local MAC address entry, the message searching unit may search out a sent ISIS LSP message containing a MAC address in the removed local MAC address entry and a VXLAN corresponding to the MAC address from a LSDB corresponding to the tunnel.

The message deleting unit may delete the MAC address in the removed local MAC address entry and the VXLAN corresponding to the MAC address from the sent ISIS LSP message searched out by the message searching unit.

For each tunnel associated with the VXLAN in the removed local MAC address entry, the message sending unit may send to the peer VTEP via the tunnel the sent ISIS LSP message from which the MAC address in the removed local MAC address entry and the VXLAN corresponding to the MAC address have been deleted by the message deleting unit.

Figure 8:
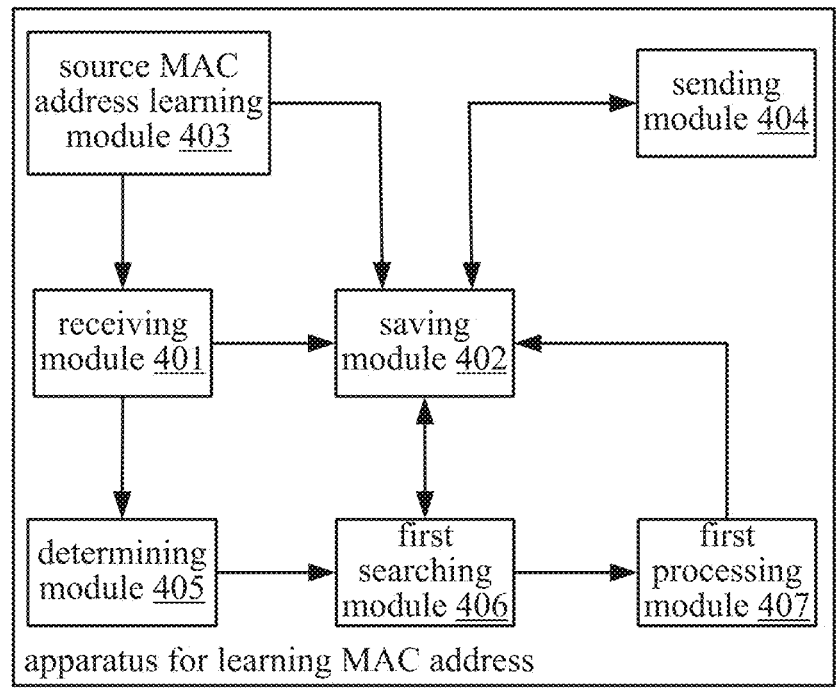
FIG. 8 is a diagram illustrating the structure of an apparatus for learning a MAC address according to another example of the present disclosure.

FIG. 8 is a diagram illustrating the structure of an apparatus for learning a MAC address according to another example of the present disclosure. As shown in FIG. 8, the apparatus includes the receiving module 401, the saving module 402, the source MAC address learning module 403 and the sending module 404 as shown in FIG. 7, and further includes a determining module 405, a first searching module 406 and a first processing module 407.

The receiving module 401 may further receive an ISIS LSP message from a peer VTEP across a tunnel.

After the receiving module 401 receives the ISIS LSP message from the peer VTEP across the tunnel, the determining module 405 may determine whether a specific received ISIS LSP message exists in a LSDB corresponding to the tunnel. The specific received ISIS LSP message is a received ISIS LSP message having the same ID as that of the received ISIS LSP message.

When the determining module 405 determines that the specific received ISIS LSP message does not exist, the first searching module 406 may search for a remote MAC address entry from the MAC address forwarding table according to a VXLAN contained in the received ISIS LSP message and a MAC address corresponding to the VXLAN after determining that the VXLAN contained in the received ISIS LSP received is associated with the tunnel.

When the first searching module 406 searches out the remote MAC address entry, the first processing module 407 may update an egress interface in the remote MAC address entry into the tunnel. When the first searching module 406 does not search out the remote MAC address entry, the first processing module 407 may add the remote MAC address entry to the MAC address forwarding table. The added remote MAC address entry includes the VXLAN contained in the received ISIS LSP message and the MAC address corresponding to the VXLAN.

Figure 9:
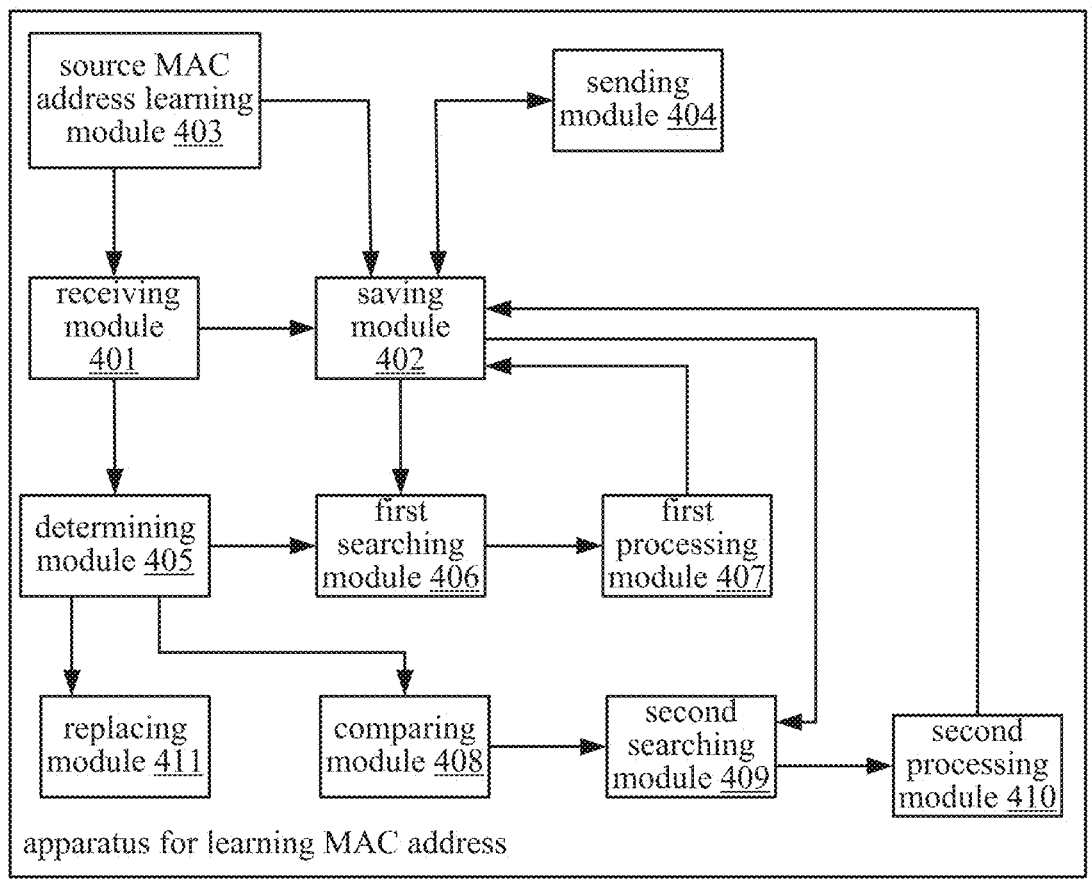
FIG. 9 is a diagram illustrating the structure of an apparatus for learning a MAC address according to another example of the present disclosure.

FIG. 9 is a diagram illustrating the structure of an apparatus for learning a MAC address according to another example of the present disclosure. As shown in FIG. 9, the apparatus includes the receiving module 401, the saving module 402, the source MAC address learning module 403, the sending module 404, the determining module 405, the first searching module 406 and the first processing module 407 as shown in FIG. 8, and further includes a comparing module 408, a second searching module 409, a second processing module 410 and a replacing module 411.

When the determining module 405 determines that the specific received ISIS LSP message exists, the comparing module 408 may compare the received ISIS LSP message with the specific received ISIS LSP message.

When the comparing module 408 determines that the received ISIS LSP message contains a MAC address corresponding to a VXLAN but the specific received ISIS LSP message does not contain the MAC address corresponding to the VXLAN, the second searching module 409 may search for a remote MAC address entry from the MAC address forwarding table according to the VXLAN and the MAC address after determining that the VXLAN is associated with the tunnel on the VTEP.

When the second searching module 409 searches out the remote MAC address entry, the second processing module 410 may update the egress interface in the remote MAC address entry into the tunnel. When the second searching module 409 does not search out the remote MAC address entry, the second processing module 410 may add the remote MAC address entry containing the VXLAN and the MAC address to the MAC address forwarding table.

The replacing module 411 may replace the specific received ISIS LSP message with the received ISIS LSP message.

Figure 10:
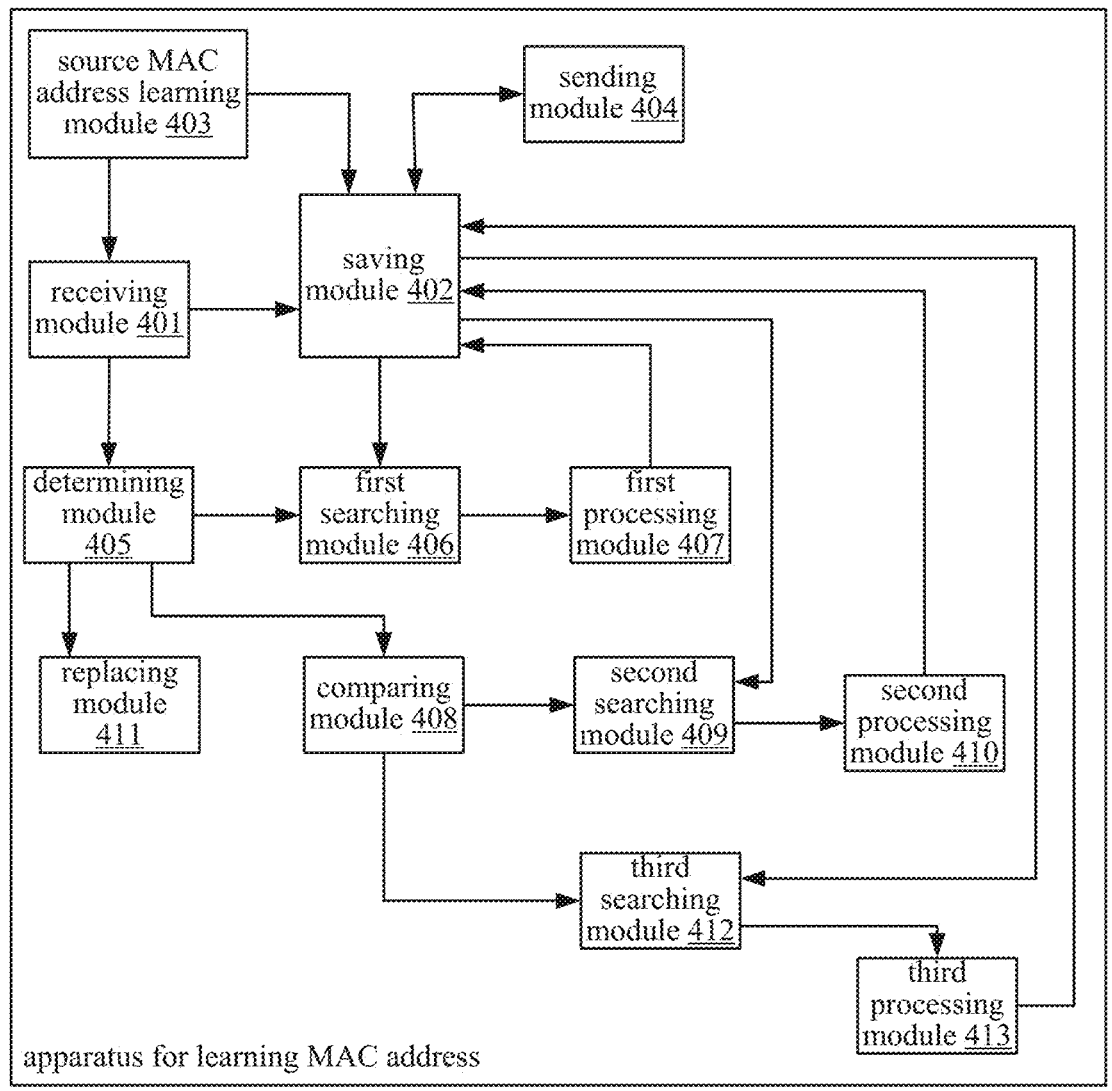
FIG. 10 is a diagram illustrating the structure of an apparatus for learning a MAC address according to another example of the present disclosure.

FIG. 10 is a diagram illustrating the structure of an apparatus for learning a MAC address according to another example of the present disclosure. As shown in FIG. 10, the apparatus includes the receiving module 401, the saving module 402, the source MAC address learning module 403, the sending module 404, the determining module 405, the first searching module 406, the first processing module 407, the comparing module 408, the second searching module 409, the second processing module 410 and the replacing module 411 as shown in FIG. 9, and further includes a third searching module 412 and a third processing module 413.

When the comparing module 408 determines that the specific received ISIS LSP message contains a MAC address corresponding to a VXLAN but the received ISIS LSP message does not contain the MAC address corresponding to the VXLAN, the third searching module 412 may search out the remote MAC address entry from the MAC address forwarding table according to the VXLAN, the MAC address and the tunnel after determining that the VXLAN is associated with the tunnel on the VTEP.

The third processing module 413 may delete the remote MAC address entry searched out by the third searching module 412.

The various modules described above in FIGS. 7-10 may be implemented by hardware such as an application specific integrated chip (ASIC), field programmable gate array (FPGA) or other processor, or a processor executing machine readable instructions, or a combination of these approaches. In one example the modules are implemented by a processor executing machine readable instructions stored on a non-transitory machine readable storage medium.

Figure 11:
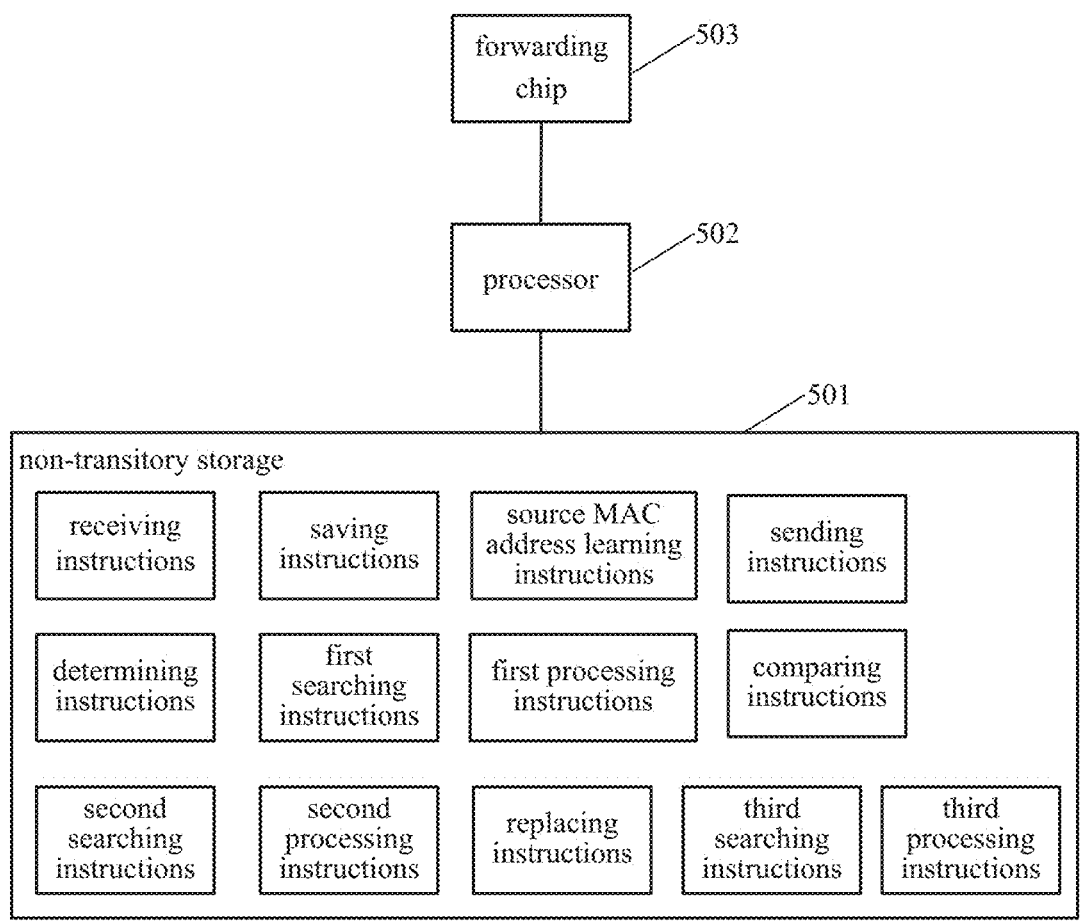
FIG. 11 is a diagram illustrating a hardware structure of an apparatus for learning a MAC address according to another example of the present disclosure.

FIG. 11 is a diagram illustrating a hardware structure of an apparatus for learning a MAC address according to another example of the present disclosure. The apparatus includes a non-transitory storage 501, a processor 502 (for example, a CPU) communicating with the non-transitory storage 501, and a forwarding chip 503.

The non-transitory storage 501 may store machine readable instructions, including receiving instructions, source MAC address learning instructions and sending instructions that can be executed by the processor 502. The non-transitory storage 501 may further store saving instructions, determining instructions, first searching instructions, first processing instructions, comparing instructions, second searching instructions, second processing instructions, replacing instructions, third searching instructions and third processing instructions, which are all machine readable instructions that can be executed by the processor 502.

The processor 502 may communicate with the forwarding chip 503 to process messages sent by the forwarding chip 503.

The processor 502 may read the receiving instructions stored in the non-transitory storage 501 to perform a process of: receiving a data message from a local network and receiving a data message from a tunnel.

The processor 502 may read the source MAC address learning instructions stored in the non-transitory storage 501 to perform a process of: learning a source MAC address after receiving the data message from the local network, and adding a learned local MAC address entry to a MAC address forwarding table; and not learning a source MAC address after receiving the data message from the tunnel.

The processor 502 may read the sending instructions stored in the non-transitory storage 501 to perform a process of: when a local MAC address entry in the MAC address forwarding table changes, sending a synchronization message via each tunnel associated with a VXLAN in the changed local MAC address entry, and saving the synchronization message into a database corresponding to the tunnel, so that a peer VTEP across the tunnel updates a MAC address forwarding table on the peer VTEP according to the synchronization message.

The processor 502 may read the saving instructions stored in the non-transitory storage 501 to perform a process of: saving the MAC address forwarding table and the database corresponding to the tunnel. Each tunnel corresponds to one database.

The processor 502 may read the determining instructions stored in the non-transitory storage 501 to perform a process of: After receiving the ISIS LSP message from the peer VTEP across the tunnel, determining whether a specific received ISIS LSP message exists in a LSDB corresponding to the tunnel. The specific received ISIS LSP message is a received ISIS LSP message having the same ID as that of the received ISIS LSP message The processor 502 may read the first searching instructions stored in the non-transitory storage 501 to perform a process of: when determining that the specific received ISIS LSP message does not exist, searching for a remote MAC address entry from the MAC address forwarding table according to a VXLAN contained in the received ISIS LSP message and a MAC address corresponding to the VXLAN after determining that the VXLAN contained in the received ISIS LSP is associated with the tunnel.

The processor 502 may read the first processing instructions stored in the non-transitory storage 501 to perform a process of: when searching out the remote MAC address entry, updating an egress interface in the remote MAC address entry into the tunnel; when not searching out the remote MAC address entry, adding the remote MAC address entry to the MAC address forwarding table. The added remote MAC address entry includes the VXLAN contained in the received ISIS LSP message and the MAC address corresponding to the VXLAN.

The processor 502 may read the comparing instructions stored in the non-transitory storage 501 to perform a process of: when determining that the specific received ISIS LSP message exists, comparing the received ISIS LSP message with the specific received ISIS LSP message.

The processor 502 may read the second searching instructions stored in the non-transitory storage 501 to perform a process of: when determining that the received ISIS LSP message contains a MAC address corresponding to a VXLAN but the specific received ISIS LSP message does not contain the MAC address corresponding to the VXLAN, searching for a remote MAC address entry from the MAC address forwarding table according to the VXLAN and the MAC address after determining that the VXLAN is associated with the tunnel on the VTEP.

The processor 502 may read the second processing instructions stored in the non-transitory storage 501 to perform a process of: when searching out the remote MAC address entry, updating the egress interface in the remote MAC address entry into the tunnel; when not searching out the remote MAC address entry, adding the remote MAC address entry containing the VXLAN and the MAC address to the MAC address forwarding table.

The processor 502 may read the replacing instructions stored in the non-transitory storage 501 to perform a process of: replacing the specific received ISIS LSP message with the received ISIS LSP message.

The processor 502 may read the third searching instructions stored in the non-transitory storage 501 to perform a process of: when determining that the specific received ISIS LSP message contains a MAC address corresponding to a VXLAN but the received ISIS LSP message does not contain the MAC address corresponding to the VXLAN, searching out the remote MAC address entry from the MAC address forwarding table according to the VXLAN, the MAC address and the tunnel after determining that the VXLAN is associated with the tunnel on the VTEP.

The processor 502 may read the third processing instructions stored in the non-transitory storage 501 to perform a process of: deleting the searched-out remote MAC address entry.

The forwarding chip 503 may be connected to other VTEPs in the VXLAN through its ports, and receive and send messages. For example, the forwarding chip 503 may send messages received from other VTEPs in the VXLAN to the processor 502, and send messages received from the processor 502 to other VTEPs in the VXLAN.

Various examples of the present disclosure provide a solution for synchronizing MAC address information on a control plane. Each tunnel on a VTEP corresponds to one database dependent from another database, which may save synchronization messages received and sent via the tunnel. When a local MAC address entry in a MAC address forwarding table changes, for example, a local MAC address entry is newly added or removed, any VTEP may send a synchronization message to a peer VTEP via a tunnel associated with a VXLAN in the newly-added or removed local MAC address entry. Accordingly, the peer VTEP may update a MAC address forwarding table on the peer VTEP according to the synchronization message. Thus, MAC address information in the local MAC address entries on the VTEPs at both ends of the tunnel can be synchronized automatically. Since the synchronization of MAC address information is performed in real time, network convergence can be speeded up, the number of unicast data messages with unknown destination addresses can be decreased, and the waste of network bandwidth resources can be reduced. Further, each tunnel corresponds to one independent database for saving synchronization messages sent and received via the tunnel, and thus the synchronization messages can be saved conveniently.

When the synchronization message is implemented by an ISIS LSP message, each tunnel on a VTEP corresponds to one LSDB dependent from another LSDB. When any VTEP finds that a local MAC address entry changes, for example, a local MAC address entry is newly added or removed, via a tunnel associated with a VXLAN in the newly-added or removed local MAC address entry, the VTEP may synchronize a MAC address in the newly-added or removed local MAC address entry and the VXLAN corresponding to the MAC address to a peer VTEP across the tunnel through an ISIS LSP message, and save the ISIS LSP message into a LSDB corresponding to the tunnel. When any VTEP receives an ISIS LSP message from a peer VTEP, the VTEP may determine, according to the received ISIS LSP message and a received ISIS LSP message saved in a LSDB corresponding to a tunnel via which the ISIS LSP message is received, whether a local MAC address entry is newly added to or removed from a MAC address forwarding table on the peer VTEP. When determining that the VXLAN in the newly-added or removed local MAC address entry on the VTEP is associated with the tunnel, the VTEP may update the MAC address forwarding table on the VTEP according to the newly-added or removed local MAC address entry. The remote MAC address entry may be added to, removed from or edited in the MAC address forwarding table on the VTEP, so that MAC address information in the local MAC address entries on the VTEPs at both ends of the tunnel can be synchronized automatically. Since the synchronization of MAC address information is performed in real time, network convergence can be speeded up, the number of unicast data messages with unknown destination addresses can be decreased, and the waste of network bandwidth resources can be reduced.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for learning a Medium Access Control (MAC) address in a Virtual Extensible Local Area Network (VXLAN), being applicable to a VXLAN Tunnel End Point (VTEP) and comprising:
    in response to receiving, at the VTEP, a data message from a local network associated with the VTEP, turning on a MAC-address-learning function to learn a source MAC address of the data message and adding a learned local MAC address entry to a first MAC address forwarding table maintained by the VTEP, wherein the learned local MAC address entry comprises the learned source MAC address, a VXLAN corresponding to the learned source MAC address, and a physical port via which the VTEP is coupled to a terminal device sending the data message;
    in response to receiving, at the VTEP, a data message from a tunnel associated with the VTEP, turning off the MAC-address-learning function such that a source MAC address of the data message received from the tunnel is not learnt;
    in response to receiving, at the VTEP, a synchronization message from the tunnel, adding a remote MAC address entry in the first MAC address forwarding table, wherein the received synchronization message indicates that a MAC address entry local to a peer VTEP at another end of the tunnel has been added to a second address forwarding table maintained by the peer VTEP; and
    when a local MAC address entry in the first MAC address forwarding table changes, sending a synchronization message via each tunnel associated with a VXLAN in the changed local MAC address entry and saving the sent synchronization message into a tunnel-specific database corresponding to each tunnel, wherein each tunnel-specific database is configured to store synchronization messages traversing a corresponding tunnel.

2. The method of claim 1, wherein sending the synchronization message via each tunnel associated with the VXLAN in the changed local MAC address entry, and saving the sent synchronization message into the a tunnel-specific database corresponding to each tunnel comprises:
    when a local MAC address entry is newly added to the first MAC address forwarding table, determining a tunnel associated with a VXLAN in the newly-added local MAC address entry;
    adding a MAC address in the newly-added local MAC address entry and a VXLAN corresponding to the MAC address to an Intermediate System to Intermediate System (ISIS) Link State Protocol data unit (LSP) message, sending the ISIS LSP message to a peer VTEP via the determined tunnel, and saving the ISIS LSP message into a Link State DataBase (LSDB) corresponding to the determined tunnel.

3. The method of claim 2, wherein adding the MAC address in the newly-added local MAC address entry and the VXLAN corresponding to the MAC address to the ISIS LSP message, sending the ISIS LSP message to the peer VTEP via the determined tunnel, and saving the ISIS LSP message into the LSDB corresponding to the determined tunnel comprises:
determining whether a specific sent ISIS LSP message exists in the LSDB corresponding to the determined tunnel, wherein the specific sent ISIS LSP message is a sent ISIS LSP message to which a MAC address in the newly-added local MAC address entry and a VXLAN corresponding to the MAC address can be added;
upon determining that the specific sent ISIS LSP message does not exist, generating the ISIS LSP message, adding the MAC address in the newly-added local MAC address entry and the VXLAN corresponding to the MAC address to the ISIS LSP message, and sending the ISIS LSP message to the peer VTEP via the determined tunnel, and saving the ISIS LSP message into the LSDB corresponding to the determined tunnel; and
upon determining that the specific sent ISIS LSP message exists, adding the MAC address in the newly-added local MAC address entry and the VXLAN corresponding to the MAC address to the specific sent ISIS LSP message, and sending to the peer VTEP via the determined tunnel the specific sent ISIS LSP message to which the MAC address in the newly-added local MAC address entry and the VXLAN corresponding to the MAC address have been added.

4. The method of claim 1, wherein sending the synchronization message via each tunnel associated with the VXLAN in the changed local MAC address entry, and saving the sent synchronization message into the tunnel-specific database corresponding to the tunnel comprises:
when a local MAC address entry is removed from the first MAC address forwarding table, determining a tunnel associated with a VXLAN in the removed local MAC address entry;
searching out a sent ISIS LSP message containing a MAC address in the removed local MAC address entry and a VXLAN corresponding to the MAC address from a LSDB corresponding to the determined tunnel; and
deleting the MAC address in the removed local MAC address entry and the VXLAN corresponding to the MAC address from the searched-out sent ISIS LSP message, and sending to a peer VTEP via the determined tunnel the sent ISIS LSP message from which the MAC address in the removed local MAC address entry and the VXLAN corresponding to the MAC address have been deleted.

5. The method of claim 1, further comprising:
upon receiving an ISIS LSP message from a peer VTEP across a tunnel, determining whether a specific received ISIS LSP message exists in a LSDB corresponding to the tunnel, wherein the specific received ISIS LSP message is a received ISIS LSP message having the same ID as that of the received ISIS LSP message;
upon determining that the specific received ISIS LSP message does not exist, searching for a remote MAC address entry from the first MAC address forwarding table according a VXLAN contained in the received ISIS LSP message and a MAC address corresponding to the VXLAN after determining that the VXLAN contained in the received ISIS LSP message is associated with the tunnel on the VTEP;
upon searching out the remote MAC address entry, updating an egress interface in the remote MAC address entry into the tunnel; and
upon not searching out the remote MAC address entry, adding the remote MAC address entry to the first MAC address forwarding table, wherein the added remote MAC address entry contains the VXLAN contained in the received ISIS LSP message and the MAC address corresponding to the VXLAN.

6. The method of claim 5, further comprising:
upon determining that the specific received ISIS LSP message exists, comparing the received ISIS LSP message with the specific received ISIS LSP message;
upon determining that the received ISIS LSP message contains a MAC address corresponding to a VXLAN but the specific received ISIS LSP message does not contain the MAC address corresponding to the VXLAN, searching for a remote MAC address entry from the first MAC address forwarding table according to the VXLAN and the MAC address after determining that the VXLAN is associated with the tunnel on the VTEP;
upon searching out the remote MAC address entry, updating an egress interface in the remote MAC address entry into the tunnel;
upon not searching out the remote MAC address entry, adding the remote MAC address entry containing the VXLAN and the MAC address to the first MAC address forwarding table; and
replacing the specific received ISIS LSP message with the received ISIS LSP message.

7. The method of claim 6, further comprising:
upon determining that the specific received ISIS LSP message contains a MAC address corresponding to a VXLAN but the received ISIS LSP message does not contain the MAC address corresponding to the VXLAN, searching for a remote MAC address entry from the first MAC address forwarding table according to the VXLAN, the MAC address and the tunnel after determining that the VXLAN is associated with the tunnel on the VTEP, and deleting the searched-out remote MAC address entry from the first MAC address forwarding table.

8. The method of claim 2, wherein the ISIS LSP message comprises a Type Length Value (TLV) for containing a VXLAN and a MAC address corresponding to the VXLAN.

9. The method of claim 1, further comprising:
updating, by a peer VTEP across a tunnel, a third MAC address forwarding table on the peer VTEP according to the sent synchronization message.

10. An apparatus for learning a Medium Access Control (MAC) address in a Virtual Extensible Local Area Network (VXLAN), being applicable to a VXLAN Tunnel End Point (VTEP), the apparatus comprising:
a processor; and
a storage device storing instructions when executed by the processor cause the processor to perform a method, the method comprising:
receiving a data message from a local network or a tunnel associated with the VTEP;

turning on a MAC-address-learning function to learn a source MAC address of the data message, in response to receiving the data message from the local network;

adding a learned local MAC address entry to a first MAC address forwarding table maintained by the VTEP, wherein the learned local MAC address entry comprises the learned source MAC address, a VXLAN corresponding to the learned source MAC address, and a physical port via which the VTEP is coupled to a terminal device sending the data message;

turning off the MAC-address-learning function such that the source MAC address of the data message is not learnt, in response to receiving the data message, at the VTEP, from the tunnel associated with the VTEP;

in response to receiving, at the VTEP, a synchronization message from the tunnel, adding a remote MAC address entry in the first MAC address forwarding table, wherein the received synchronization message indicates that a MAC address entry local to a peer VTEP at another end of the tunnel has been added to a second address forwarding table maintained by the peer VTEP;

when a local MAC address entry in the first MAC address forwarding table changes, sending a synchronization message via each tunnel associated with a VXLAN in the changed local MAC address entry and saving the sent synchronization message into a tunnel-specific database corresponding to each tunnel; wherein each tunnel-specific database is configured to store synchronization messages traversing a corresponding tunnel.

11. The apparatus of claim 10, wherein sending the synchronization message via each tunnel associated with the VXLAN in the changed local MAC address entry, and saving the sent synchronization message into the a tunnel-specific database corresponding to each tunnel comprises:

when a local MAC address entry is newly added to the first MAC address forwarding table, determining a tunnel associated with a VXLAN in the newly-added local MAC address entry;

determining whether a specific sent Intermediate System to Intermediate System (ISIS) Link State Protocol data unit (LSP) message exists in a LSDB corresponding to the determined tunnel associated with the VXLAN in the newly-added local MAC address entry, wherein the specific sent ISIS LSP message is a sent ISIS LSP message to which a MAC address in the newly-added local MAC address entry and a VXLAN corresponding to the MAC address can be added;

in response to determining that the specific sent ISIS LSP message does not exist, generating an ISIS LSP message containing the MAC address in the newly-added local MAC address entry and the VXLAN corresponding to the MAC address sending the generated ISIS LSP message to a peer VTEP via the determined tunnel, and saving the generated ISIS LSP message into the LSDB corresponding to the determined tunnel;

in response to determining that the specific sent ISIS LSP message exists, adding the MAC address in the newly-added local MAC address entry and the VXLAN corresponding to the MAC address to the specific sent ISIS LSP message, and sending to the peer VTEP via the determined tunnel the specific sent ISIS LSP message to which the MAC address in the newly-added local MAC address entry and the VXLAN corresponding to the MAC address have been added.

12. The apparatus of claim 10, wherein sending the synchronization message via each tunnel associated with the VXLAN in the changed local MAC address entry, and saving the sent synchronization message into the a tunnel-specific database corresponding to each tunnel comprises:

when a local MAC address entry is removed from the first MAC address forwarding table, determining a tunnel associated with a VXLAN in the removed local MAC address entry;

for each tunnel associated with the VXLAN in the removed local MAC address entry, searching out a sent ISIS LSP message containing a MAC address in the removed local MAC address entry and a VXLAN corresponding to the MAC address from a LSDB corresponding to the tunnel;

deleting the MAC address in the removed local MAC address entry and the VXLAN corresponding to the MAC address from the sent ISIS LSP message searched out by the message searching unit; and for each tunnel associated with the VXLAN in the removed local MAC address entry, sending to a peer VTEP via the tunnel the sent ISIS LSP message from which the MAC address in the removed local MAC address entry and the VXLAN corresponding to the MAC address have been deleted.

13. The apparatus of claim 10, wherein the method further comprises:

upon receiving the ISIS LSP message from the peer VTEP across the tunnel, determining whether a specific received ISIS LSP message exists in a LSDB corresponding to the tunnel, wherein the specific received ISIS LSP message is a received ISIS LSP message having the same ID as that of the received ISIS LSP message;

in response to determining that the specific received ISIS LSP message does not exist, searching for a remote MAC address entry from the first MAC address forwarding table according to a VXLAN contained in the received ISIS LSP message and a MAC address corresponding to the VXLAN after determining that the VXLAN contained in the received ISIS LSP is associated with the tunnel; and upon searching out the remote MAC address entry, updating an egress interface in the remote MAC address entry into the tunnel;

upon not searching out the remote MAC address entry, adding the remote MAC address entry to the first MAC address forwarding table; the added remote MAC address entry comprises the VXLAN contained in the received ISIS LSP message and the MAC address corresponding to the VXLAN.

14. The apparatus of claim 13, wherein the method further comprises:

in response to determining that the specific received ISIS LSP message exists, comparing the received ISIS LSP message with the specific received ISIS LSP message;

upon determining that the received ISIS LSP message contains a MAC address corresponding to a VXLAN but the specific received ISIS LSP message does not contain the MAC address corresponding to the VXLAN, searching for a remote MAC address entry from the first MAC address forwarding table according to the VXLAN and the MAC address after determining that the VXLAN is associated with the tunnel on the VTEP;

upon searching out the remote MAC address entry, updating the egress interface in the remote MAC address entry into the tunnel;

upon not searching out the remote MAC address entry, adding the remote MAC address entry containing the VXLAN and the MAC address to the first MAC address forwarding table; and replacing the specific received ISIS LSP message with the received ISIS LSP message.

15. The apparatus of claim 14, wherein the method further comprises:

upon determining that the specific received ISIS LSP message contains a MAC address corresponding to a VXLAN but the received ISIS LSP message does not contain the MAC address corresponding to the VXLAN, searching out the remote MAC address entry from the first MAC address forwarding table according to the VXLAN, the MAC address and the tunnel after determining that the VXLAN is associated with the tunnel on the VTEP; and deleting the searched out remote MAC address entry from the first MAC address forwarding table.

* * * * *